US008105145B2

(12) United States Patent
Jaffe

(10) Patent No.: US 8,105,145 B2
(45) Date of Patent: Jan. 31, 2012

(54) GAMING MACHINE HAVING POSITIONAL EXPANDING SYMBOLS

(75) Inventor: Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 636 days.

(21) Appl. No.: 12/066,234

(22) PCT Filed: Sep. 8, 2006

(86) PCT No.: PCT/US2006/035194
§ 371 (c)(1),
(2), (4) Date: Mar. 7, 2008

(87) PCT Pub. No.: WO2007/030786
PCT Pub. Date: Mar. 15, 2007

(65) Prior Publication Data

US 2008/0188286 A1 Aug. 7, 2008

Related U.S. Application Data

(60) Provisional application No. 60/715,361, filed on Sep. 8, 2005.

(51) Int. Cl.
*A63F 13/00* (2006.01)

(52) U.S. Cl. ......................... 463/16; 463/20; 273/143 R

(58) Field of Classification Search .................... 463/16, 463/20, 25–35; 273/143 R
See application file for complete search history.

(56) References Cited

U.S. PATENT DOCUMENTS

| | | | | |
|---|---|---|---|---|
| 5,449,173 | A | 9/1995 | Thomas et al. | 273/143 |
| 6,089,977 | A * | 7/2000 | Bennett | 463/20 |
| 6,190,254 | B1 * | 2/2001 | Bennett | 463/13 |
| 6,251,013 | B1 * | 6/2001 | Bennett | 463/13 |
| 6,270,411 | B1 * | 8/2001 | Gura et al. | 463/20 |
| 6,290,600 | B1 * | 9/2001 | Glasson | 463/20 |
| 6,311,976 | B1 | 11/2001 | Yoseloff et al. | 273/138.2 |
| 6,375,570 | B1 | 4/2002 | Poole | 463/31 |
| 6,419,579 | B1 | 7/2002 | Bennett | 463/20 |
| 6,439,993 | B1 | 8/2002 | O'Halloran | 463/16 |
| 6,494,454 | B2 | 12/2002 | Adams | 273/292 |
| 6,517,432 | B1 * | 2/2003 | Jaffe | 463/16 |
| 6,561,900 | B1 * | 5/2003 | Baerlocher et al. | 463/20 |

(Continued)

FOREIGN PATENT DOCUMENTS

WO WO 01/28646 4/2001

OTHER PUBLICATIONS

International Search Report, dated Jan. 31, 2007, (2 pages).

*Primary Examiner* — Masud Ahmed
(74) *Attorney, Agent, or Firm* — Nixon Peabody LLP

(57) ABSTRACT

A gaming machine for conducting a wagering game includes a value input device for receiving a wager and a display for displaying a plurality of symbols arranged in an array of symbol positions. The plurality of symbols include at least one expandable symbol. The plurality of symbol positions include at least one expandable position. The controller is operative to vary the symbols displayed in the symbol positions, and if the expandable symbol appears in the expandable position, expand the expandable symbol into at least one other symbol position to form and display an expanded symbol.

20 Claims, 6 Drawing Sheets

U.S. PATENT DOCUMENTS 6,604,740 B1 8/2003 Singer et al. .................. 273/292
6,616,142 B2 9/2003 Adams .......................... 273/292
6,634,941 B2 10/2003 Olive .............................. 463/16
6,780,109 B2 8/2004 Kaminkow ..................... 463/20
6,805,349 B2 10/2004 Baerlocher et al. ........ 273/138.2
6,805,632 B2 10/2004 Suda ............................... 463/25
6,866,583 B2 3/2005 Glavich et al. .................. 463/20
6,905,406 B2 6/2005 Kaminkow et al. ............. 463/20
6,921,335 B2 7/2005 Rodgers et al. ................. 463/30
6,997,808 B2 2/2006 Rodgers et al. ................. 463/30
7,014,559 B1 3/2006 Fong ............................... 463/20
7,048,275 B2 5/2006 Adams .......................... 273/292
7,056,213 B2 6/2006 Ching et al. .................... 463/20
7,070,502 B1 7/2006 Bussick et al. .................. 463/20
7,074,127 B2 7/2006 Cuddy et al. .................... 463/20
7,090,580 B2 8/2006 Rodgers et al. ................. 463/20
7,137,888 B2 11/2006 Glavich et al. .................. 463/20
7,195,559 B2 3/2007 Gilmore et al. ................. 463/20
7,226,359 B2 6/2007 Bussick et al. .................. 463/20
7,237,775 B2 7/2007 Thomas et al. ............... 273/143
7,252,592 B2 8/2007 Rodgers et al. ................. 463/30
7,704,141 B1 4/2010 Marks et al.
7,758,414 B1 * 7/2010 Marks et al. .................... 463/20
2002/0039918 A1 * 4/2002 Anderson et al. ............... 463/16
2002/0047238 A1 * 4/2002 Ainsworth et al. ........... 273/292
2003/0064779 A1 * 4/2003 Suda ............................... 463/20
2003/0069062 A1 * 4/2003 Shimizu .......................... 463/20
2004/0033827 A1 * 2/2004 Gilmore et al. ................. 463/20
2005/0130731 A1 * 6/2005 Englman et al. ................ 463/20
2005/0130737 A1 * 6/2005 Englman et al. ................ 463/25
2005/0148384 A1 * 7/2005 Marks et al. .................... 463/20
2005/0159208 A1 7/2005 Pacey .............................. 463/20
2006/0068873 A1 3/2006 Gomez
2006/0068885 A1 * 3/2006 Cregan et al. ................... 463/20

* cited by examiner

GAMING MACHINE HAVING POSITIONAL EXPANDING SYMBOLS

CROSS-REFERENCE TO RELATED APPLICATIONS

This application is a U.S. national phase of, and claims priority to, International Application No. PCT/US2006/035194, filed Sep. 8, 2006, which claims the benefit of priority of U.S. Provisional Patent Application No. 60/715,361, filed Sep. 8, 2005, both of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having positional expanding symbols.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

One problem that exists with traditional gaming machines is that they offer only a limited number of opportunities to achieve winning outcomes on a single play of the game. Despite having increasing numbers of paylines, traditional games fail to include mechanisms that offer an opportunity for symbols to be repeated or copied for additional winning combination occurrences. The present invention is directed to solving one or more of these and other problems.

SUMMARY OF THE INVENTION

According to one aspect of the present invention, a gaming machine for conducting a wagering game includes a value input device for receiving a wager and a display for displaying a plurality of symbols arranged in an array of symbol positions. The plurality of symbols include at least one expandable symbol. The plurality of symbol positions include at least one expandable position. The controller is operative to vary the symbols displayed in the symbol positions, and if the expandable symbol appears in the expandable position, expand the expandable symbol into at least one other symbol position to form and display an expanded symbol.

According to another aspect of the invention, a method of conducting a wagering game on a gaming machine comprises receiving a wager and displaying a plurality of symbols arranged in an array of symbol positions. The plurality of symbols include at least one expandable symbol and the plurality of symbol positions include at least one expandable position. The method further comprises varying the symbols displayed in the symbol positions and if the expandable symbol appears in the expandable position, expanding the expandable symbol into at least one other adjacent symbol position to form and display an expanded symbol.

According to yet another aspect of the invention, a method of conducting a wagering game on a gaming machine comprises receiving a wager and displaying a plurality of symbols arranged in an array of symbol positions. The plurality of symbols include at least one expandable symbol and the plurality of symbol positions include a plurality of expandable positions designated by one or more indicators. The method further comprises providing a plurality of paylines passing through the array. The method further comprises varying the symbols displayed in the symbol positions, and if the expandable symbol appears in one of the expandable positions, expanding the expandable symbol into at least one other adjacent symbol position to form and display a unified expanded symbol.

According to yet another aspect of the invention, a computer readable storage medium is encoded with instructions for directing a gaming device to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1:
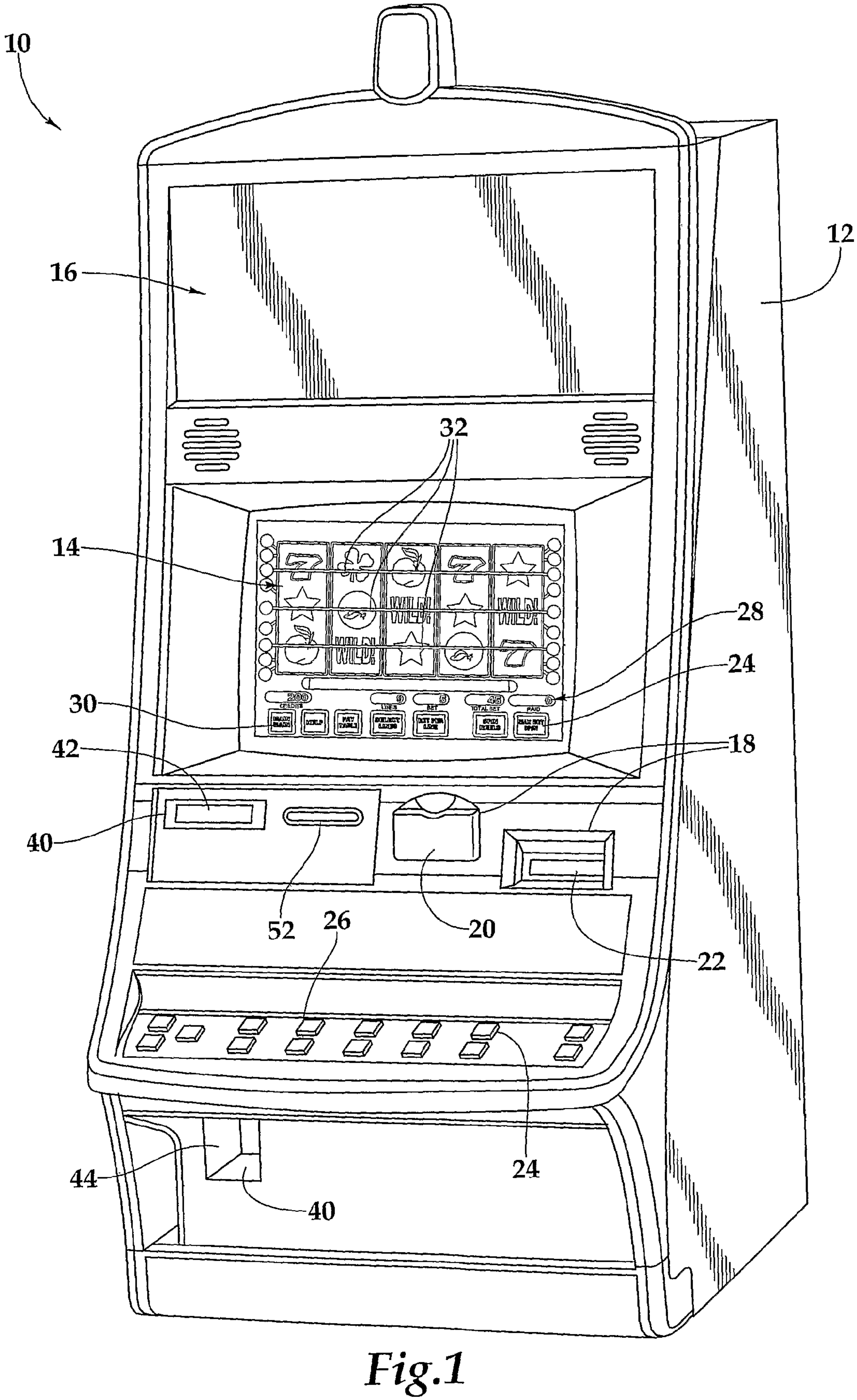
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
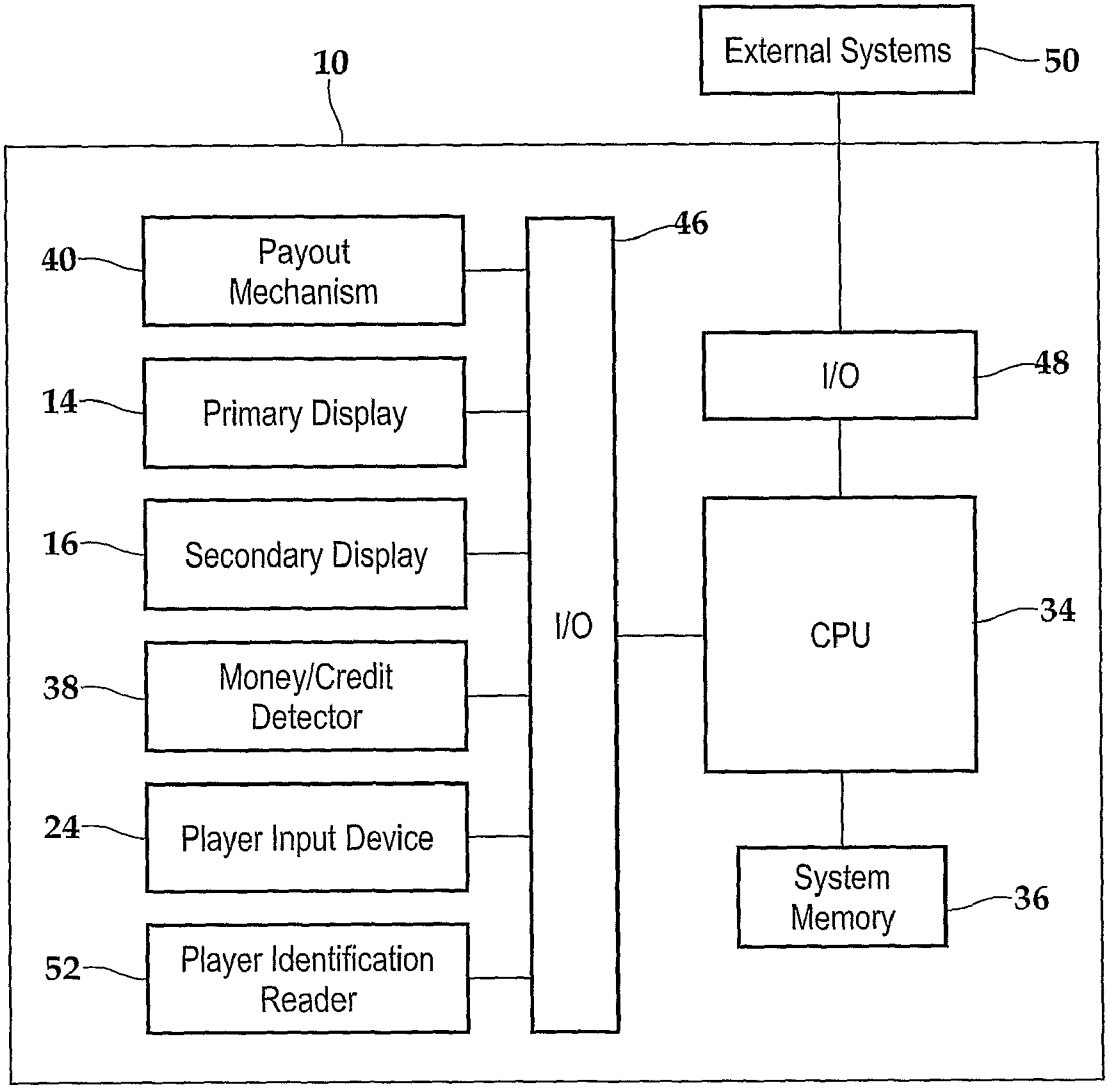
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
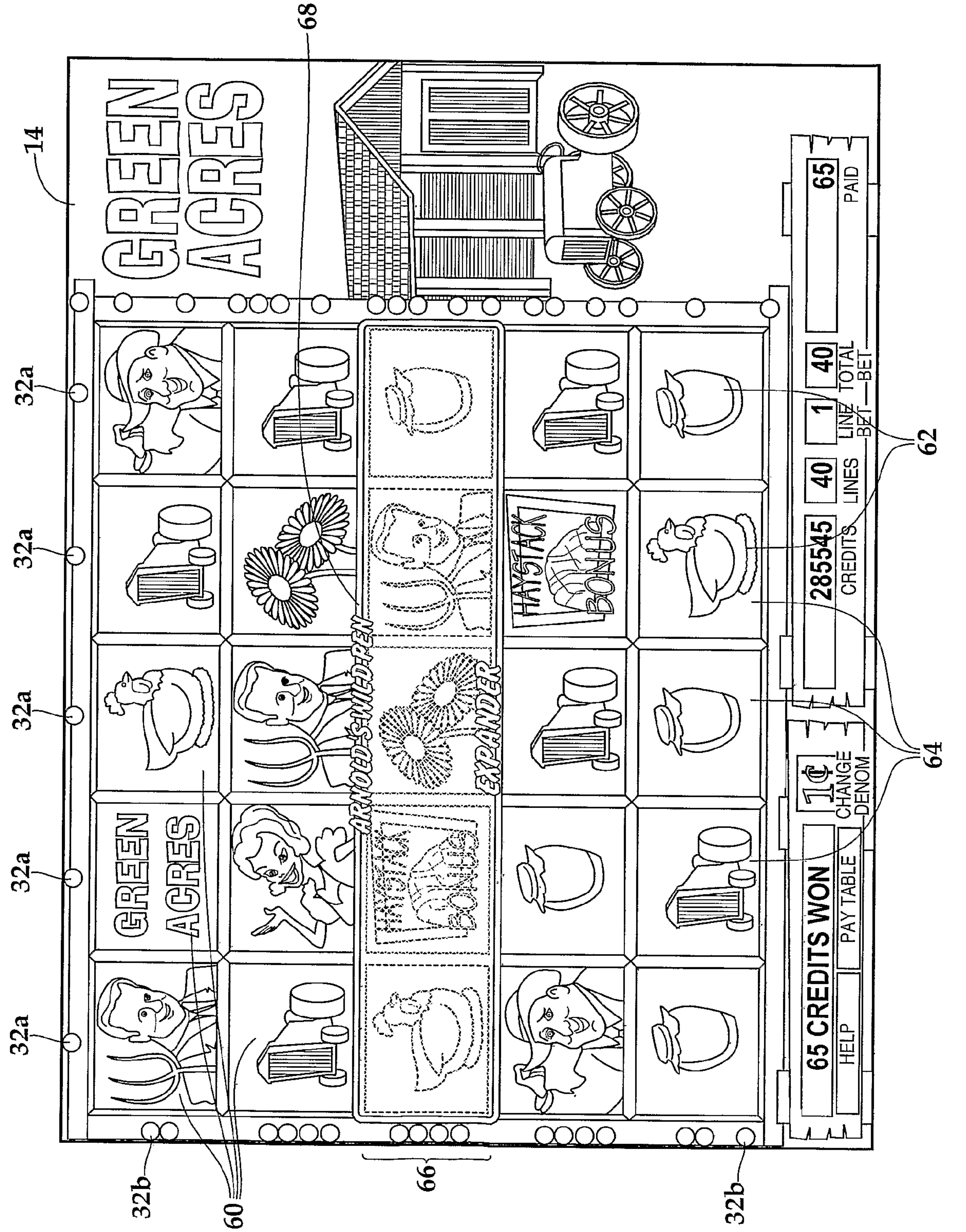
FIG. 3 is a screen shot of a primary display of a gaming machine according to the present invention.

Turning now to FIG. 3, a screen shot of the primary display 14 of the gaming machine 10 is depicted displaying the game executed on the gaming machine 10. The display 14 is a video display which displays a plurality of simulated symbol bearing reels 60. Any configuration of reels 60 is possible, including a plurality of reels arranged in a row. However, in this preferred embodiment, the reels 60 are arranged in a two dimensional array comprising a 5×5 matrix. Each reel 60 bears a plurality of symbols 62 displayed in one or more symbol positions 64. In the preferred embodiment shown, each reel 60 includes only one displayed symbol position 64, and thus displays only one symbol 62 at a time. During a play of the game, all of the reels 60 spin and stop to display one symbol 62 in their respective symbol positions 64. In alternative embodiments, the reels 60 may have more than one displayed symbol position 64 and thus may display more than one symbol 62 during each play of the game. In other alternative embodiments, the symbol positions 64 may form an array without utilizing any reels 60. For example, the symbols 62 may be varied by being cascaded into or dropped into the symbol positions 64 forming the array, or pushed into the array displacing symbols 62 already in the array.

Figure 4:
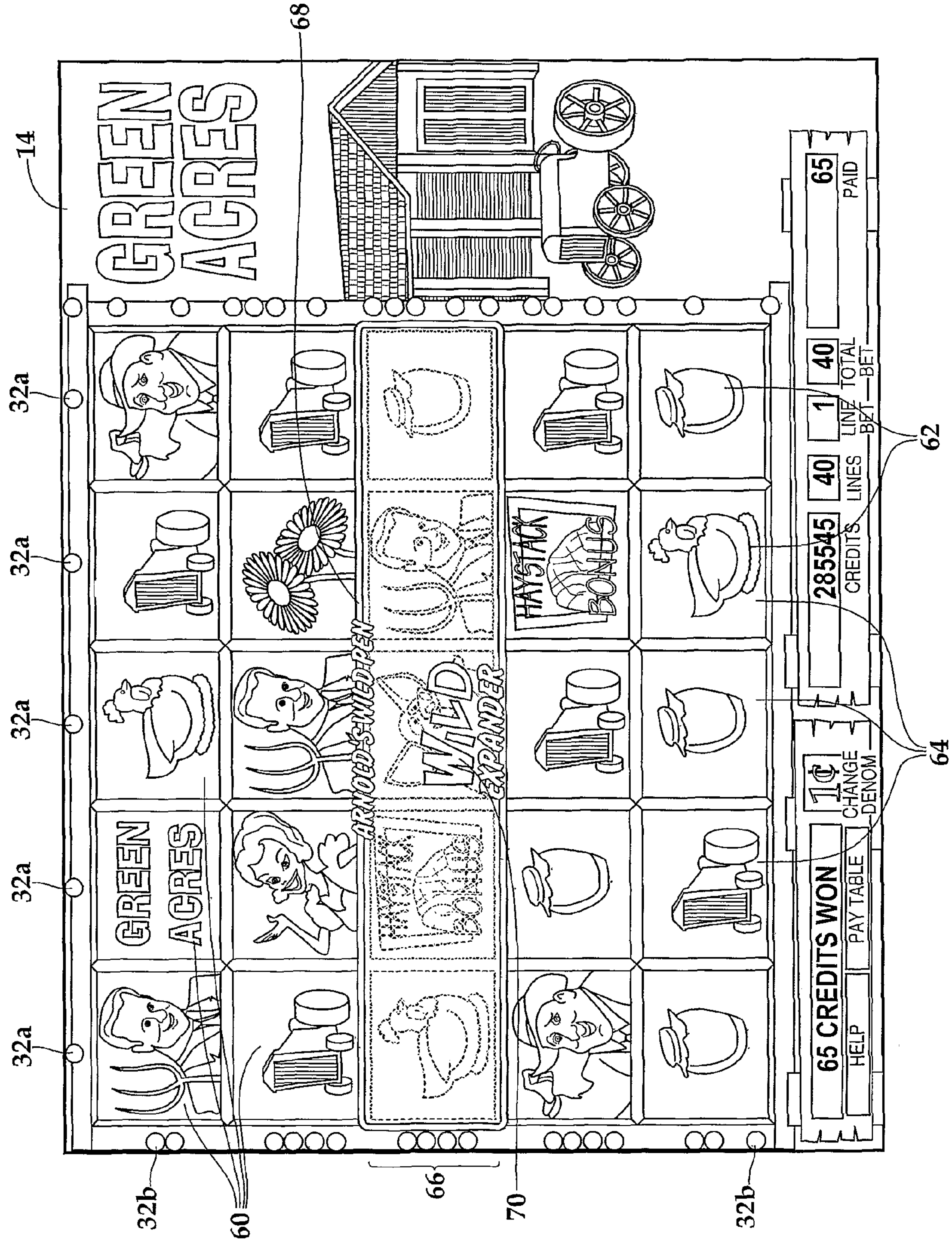
FIG. 4 is a screen shot of the gaming machine depicting an expandable symbol.

The display 14 further includes a plurality of expandable positions 66 in the array of symbol positions 64 of the reels 60. The expandable positions 66 are preferably displayed and designated on the display 14 by one or more expandable position indicators 68. The indicators 68 serve to designate the expandable positions 66 visually to a player of the gaming machine 10. In this embodiment, the expandable positions 66 occupy the middle row of symbol positions 64 as displayed along the middle row of reels 60 of the array. Moreover, in this embodiment, the expandable position indicator 68 is an outline of the expandable positions with a label entitled "Arnolds Wild Pen Expander" positioned along the outline, as seen in FIGS. 3-4. The expandable positions 66 may be located anywhere within the array of symbol positions 64, and may be varied throughout various plays of the game. Furthermore, the expandable position indicators 68 may take the form of any visual, audio, or audio-visual indicator which designates to a player of the gaming machine 10 that a certain symbol position 64 is an expandable position 66. For example, expandable position indicators 68 may include outlines, highlighting, illuminations, symbol alteration, enlargement, or color change, or physical designations such as reel glass outlines, graphics, or windows.

The display 14 further includes a plurality of paylines 32 passing through a plurality of symbol positions 64 to designate a line on which a combination of symbols 62 is evaluated for winning combinations. Winning combinations of symbols 62 failing on a payline 32 are awarded with a prize or award in accordance with a paytable of the gaming machine 10. The gaming machine 10 includes vertically oriented paylines **32*a* and horizontally oriented paylines 32*b*. The vertically oriented paylines 32*a* pass generally vertically, or top to bottom, through the symbol positions 64 on the reels 60. Similarly, the horizontally oriented paylines 32*b* pass generally horizontally, or left to right, through the symbol positions 64 on the reels 60. It should be noted that the paylines 32*a,b* may be directional in that the vertically oriented paylines 32*a* may be evaluated top to bottom or bottom to top, or both, while the horizontally oriented paylines 32*b* may be evaluated left to right or right to left, or both. In other words, some vertical paylines 32*a* may be top to bottom while others are bottom to top, and some horizontal paylines 32*b* may be left to right while others are right to left. Moreover, although the vertical paylines 32*a* generally flow vertically and the horizontal paylines 32*b* generally flow horizontally, all of the paylines 32** may be arranged to flow diagonally, or otherwise zigzag through the symbol positions 64 on the reels 60 from one side of the array to the other.

Turning to FIG. 4, the primary display 14 of the gaming machine 10 is depicted following a play of the game where the reels 60 have spun and stopped to display a plurality of symbols 62 in the various symbol positions 64. In the center of the array, an expandable symbol 70 has landed on the center reel 60. In this embodiment, the expandable symbol 70 is a "wild" symbol which may substitute for any symbol 62 on the reels 60, but the expandable symbol 70 may be any symbol 62 on any of the reels 60. For example, the expandable symbols 70 may include wild symbols, bonus triggering symbols, scatter pay symbols or other regular symbols 62 displayed on the reels 60.

Figure 5:
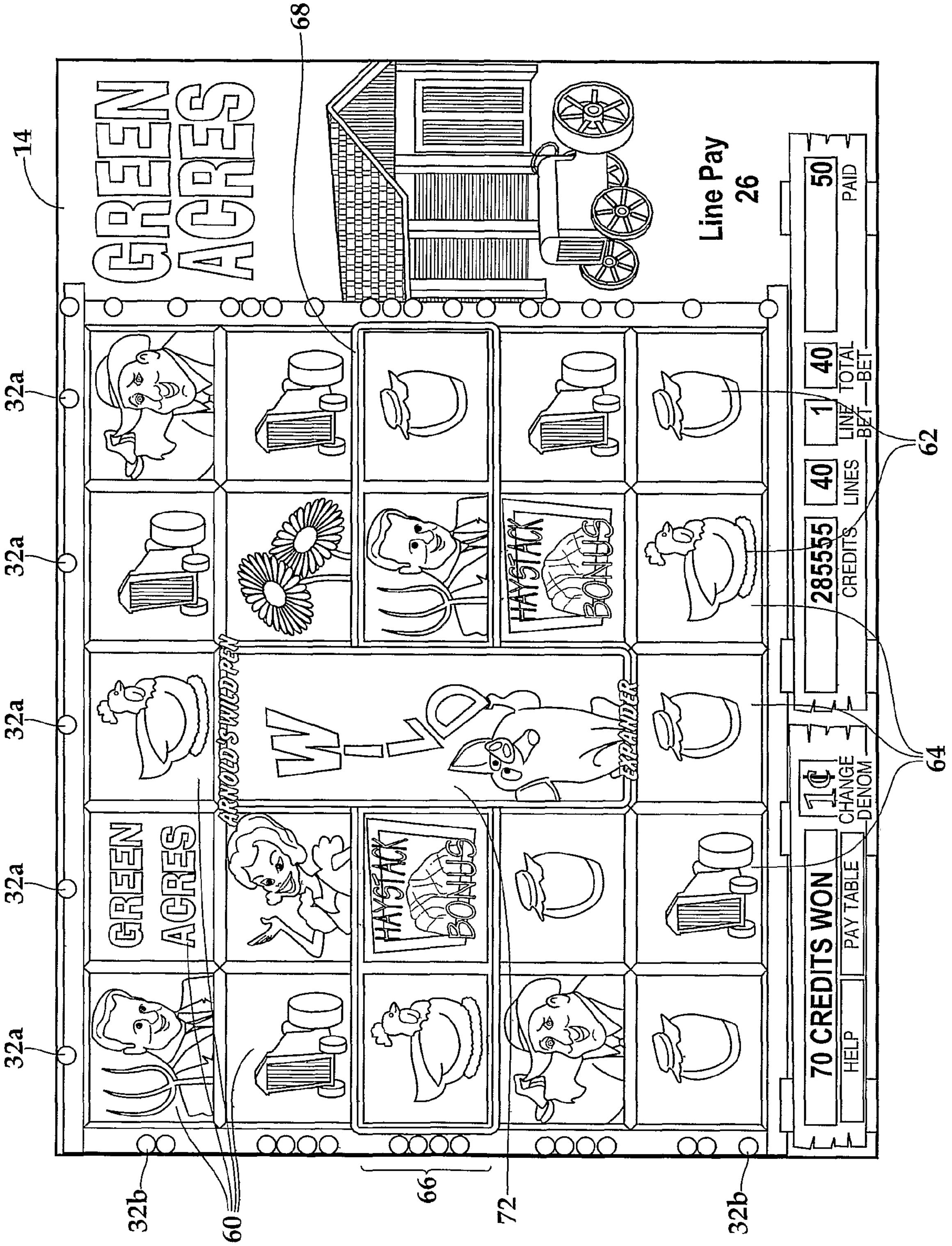
FIG. 5 is a screen shot of the gaming machine depicting an expanded symbol.

Turning to FIG. 5, the primary display 14 of the gaming machine 10 displays an expanded symbol 72, which in this case is an elongated "wild" symbol. The triggering mechanism for the display of the expanded symbol 72 is the fact that the expandable symbol 70 (the center "wild" symbol in FIG. 4) has appeared or "landed" in one of the expandable positions 66 of the array, indicated by the expandable position indicator 68. Stated differently, an expandable symbol 70 appearing in an expandable position 66 in the array of symbol positions 64 triggers the expandable symbol 70 to expand and display an expanded symbol 72 as seen in FIG. 5. The expanded symbol 72 may comprise an elongated, enlarged, or stretched out version of the expandable symbol 70. The expanded symbol 72 replaces the symbols 62 in the adjacent symbol positions 64 to the expandable position 66 that triggered the display of the expanded symbol 72. Thus, the "man with the pitch fork" symbol 62 and the "tractor" symbol 62 directly above and below the "wild" expandable symbol 70 in FIG. 4 have been replaced by a unified "wild" expanded symbol 72 in FIG. 5. Alternatively, the expansion may involve copying of the expandable symbol 70 such that the expanded symbol 72 comprises a plurality of copied expandable symbols 70. In such a configuration, symbols 62 in other symbol positions 64 in the array would be replaced by the expandable symbol 70 to form the expanded symbol 72. Upon the expansion of an expandable symbol 70 into an expanded symbol 72, the gaming machine 10 reevaluates the paylines 32 for additional winning combinations which may have been created as a result of the expanded symbol 72.

It should be further understood that the expanded symbol 72 need not be expanded into symbol positions 64 which are adjacent to the expandable position 66 triggering the expansion. Rather, the expanded symbol 72 may comprise a plurality of expandable symbols 70 copied into one or more symbol positions 64 in various locations of the array. Thus, for example, the "wild" expandable symbol 70 landing in the expandable position 66 in the center of the array may result in the formation of an expanded symbol 72 comprising "wild" symbols copied into the symbol positions 64 at the four corners of the array. Any configuration is possible which allows the expandable symbol 70 landing in the expandable position 66 to be expanded (either enlarged or copied) to one or more other symbol positions 64 in the array. Moreover, because the symbol positions 64 in the array are on separate reels 60, the expanded symbol 72 traverses more than one reel 60 in the embodiment depicted. However, it should be understood that the gaming machine 10 may be configured so that each reel 60 displays more than one symbol 62 and bears more than one symbol position 64 such that an expandable symbol 70 landing in an expandable position 66 may expand across the symbol positions 64 of a single reel 60 rather than across more than one reel 60 as shown in FIGS. 4-5.

Figure 6:
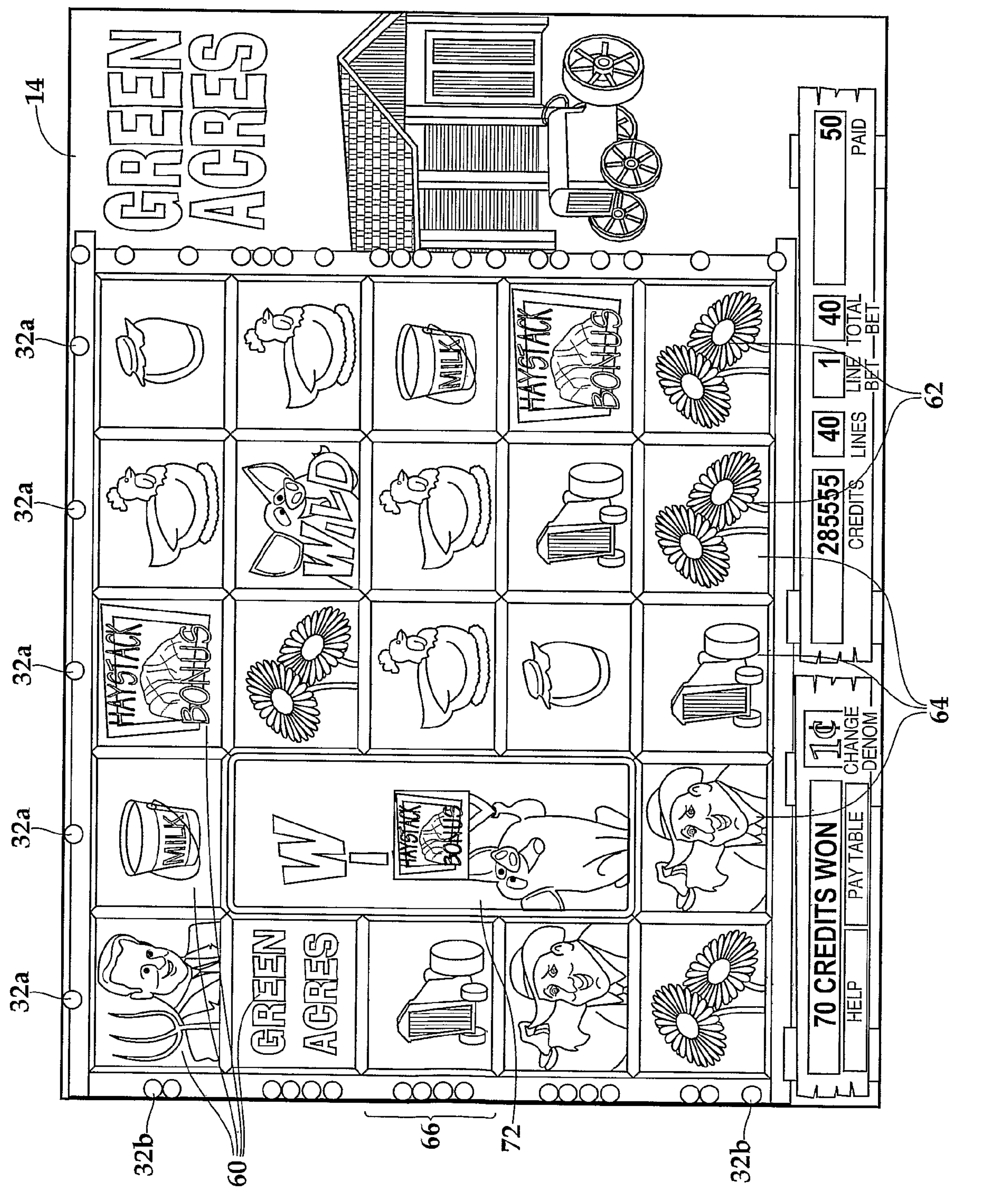
FIG. 6 is a screen shot of the gaming machine depicting an expanded symbol having another symbol overlaid thereon.

It should be noted that in some embodiments, such as the one illustrated in FIG. 6, the expanded symbol 72 may cover a symbol (e.g., "Haystack Bonus" symbol) that is used to trigger another feature, such as another bonus game or a progressive award. If such a symbol is covered by the expanded symbol 72 (enlarged or copied), a smaller version of the symbol is overlaid on the expanded symbol 72. The symbol then has two functions, that of the expanded symbol 72 and that of the symbol used to trigger the other feature (i.e., function of symbol overlaid on the expanded symbol 72).

In an alternate embodiment, the expandable symbol 70 may not expand at all, and may instead function as a triggering symbol to trigger other modifications of one or more other symbols 62 in the array. For example the triggering symbol 70 may cause other symbols in the array to change function, appearance, or location. Moreover, the triggering symbol 70 may cause other symbols in the array to move, translate, rotate, or animate in a random or predetermined order, direction, or pattern. In such a case, the expandable positions 66 serve as triggering positions 66 such that when the triggering symbol 70 lands in one of the triggering positions 66 (designated by a triggering position indicator 68), the altering of the other symbol or symbols 62 in the array occurs. It should be understood that the triggering symbol 70 may cause the other symbol or symbols 62 in the array to change function or appearance, or both.

Furthermore, it should be understood that the expanded symbol 72 may or may not have the same function of the expandable symbol 70 from which it was triggered. For example, in FIG. 5 the expanded "wild" symbol 72 has the same "wild" functionality as the underlying expandable "wild" symbol 70, although the expanded "wild" symbol 72 covers more symbol positions 64 than the single expandable symbol 70. In alternative embodiments, the expanded symbol 72 may have a function different than that of the underlying expandable symbol 70 landing in an expandable position 66 and triggering the expansion. For example, the expandable symbol 70 may be a "wild" symbol that expands to form an expanded symbol 72 which is a scatter pay symbol, or a bonus trigger symbol. Thus, the expanded symbol 72 serves to increase the number of scatter pay symbols or bonus trigger symbols, thereby increasing the chances of being awarded a scatter pay award or bonus award, respectively. Moreover, the expandable symbol 70 and the expanded symbol 72 need not have any particular functionality at all, and may rather be regular symbols 62 in the array. For example, an expandable symbol 70 may comprise a "tractor" symbol which expands to form an expanded symbol 72 of three "tractor" symbols, thereby increasing the chances that the paylines 32 passing through the three "tractor" symbols form winning combinations which include the "tractor" symbol. Irrespective of functionality, however, the expanded symbol 72 comprises at least one additional symbol position 64 than the single position expandable symbol 70.

Additionally, the expansion of the expandable symbol 70 is conditioned upon it landing in one of the expandable positions 66 in the array. The positions 66 may be fixed, as depicted herein, or may vary from one play of the game to the next. Moreover, the number and locations of the expandable positions 66 may be random, or may be located according to some predetermined criteria. It should be understood that the expandable symbols 70 may appear on any reel 60 at any symbol position 64 within the array. However, expandable symbols 70 landing in symbol positions 64 in the array which are not expandable positions 66 do not trigger the expansion described herein, although the expandable symbols 70 doing so may retain the functionality associated with the symbol 70. For example, in FIG. 4, had the "wild" expandable symbol 70 landing in the center of the array landed at one of the corners of the array, the symbol 70 would still be "wild", but no expansion would be triggered since the corners of the array are not expandable positions 66 as designated by the expandable position indicator 68. In this way, the expandable symbols 70 are “positional” in that they only expand to form an expanded symbol 72 when they land or are located in an expandable position 66, as described herein.

The gaming machine 10 having positional expandable symbols 70 described herein offer a number of benefits over symbols and games employed on traditional gaming machines. The expansion of the symbols 70 allows multiple opportunities to achieve winning combinations without increasing the number of paylines 32, reels 60, or symbols 62 on the gaming machine 10. Moreover, the expansion of the symbols 70 permits symbols to transform and achieve multiple functionality. Furthermore, the expanded symbols 72 permit the function of an expandable symbol 70 to be conveyed to other symbols 62 on the reel 60, or even across multiple reels 60.

Each of these embodiments and obvious variations thereof is contemplated as falling within the spirit and scope of the claimed invention, which is set forth in the following claims.

What is claimed is:

1. A gaming system comprising: an input device for receiving a wager;

one or more displays for displaying a plurality of symbols arranged in an array of symbol positions, the plurality of symbols including at least one expandable symbol, the array of symbol positions including at least one expandable position indicated by a displayed expandable position indicator which is not a payline and at least one non-expandable position; and a controller including one or more processors, the controller operative to (i) vary the symbols displayed in the array of symbol positions; and (ii) if the at least one expandable symbol appears in the at least one expandable position, expand the at least one expandable symbol into at least one other symbol position in the array, outside of the at least one expandable position, to form and display at least one expanded symbol; and (iii) if the at least one expandable symbol appears in the at least one non-expandable position, do not expand the at least one expandable symbol.

2. The gaming system of claim 1, wherein the expandable symbol is expanded to an adjacent symbol position.

3. The gaming system of claim 2, wherein the expanded symbol is a unified symbol occupying the expandable position and the adjacent symbol position.

4. The gaming system of claim 1, wherein the expanded symbol has the same functionality as the expandable symbol.

5. The gaming system of claim 1, wherein the expandable symbol is a wild symbol.

6. The gaming system of claim 1, wherein the expandable position is designated by an expandable position indicator that is independent of the symbol displayed in the expandable position.

7. The gaming system of claim 1, wherein each symbol position in the array comprises an individual reel.

8. The gaming system of claim 1, wherein the expanded symbol comprises a plurality of copies of the expandable symbol.

9. The gaming system of claim 8, wherein at least two of the copies are in symbol positions not adjacent to one another.

10. A method of conducting a wagering game on a gaming system, the method comprising:

receiving a wager from a player via an input device;

displaying, via one or more displays, a plurality of symbols arranged in an array of symbol positions, the plurality of symbols including at least one expandable symbol, the array of symbol positions including one or more designated expandable regions, the one or more designated expandable regions comprising one or more expandable positions indicated by one or more displayed expandable position indicators that are independent of the symbols displayed in the one or more expandable symbol positions and a payline;

randomly varying the symbols displayed in the array of symbol positions, via one or more processors;

prior to completing the varying of the symbols, designating the one or more designated expandable regions; and if the at least one expandable symbol appears in the one or more designated expandable regions, expanding the at least one expandable symbol into at least one other adjacent symbol position in the array, outside of the one or more designated expandable regions, to form and display at least one expanded symbol.

11. The method of claim 10, wherein the plurality of symbols are arranged on a plurality of reels, and the varying step comprises spinning and stopping the reels.

12. The method of claim 10, wherein the at least one expanded symbol comprises a unified symbol occupying one of the one or more expandable positions within the one or more designated expandable regions and the at least one other adjacent symbol position outside of the one or more designated expandable regions.

13. The method of claim 12, wherein both the expandable symbol and the expanded symbol are wild symbols.

14. The method of claim 10, wherein each symbol position comprises an individual reel.

15. A method of conducting a wagering game on a gaming system, the method comprising:

receiving a wager from a player via an input device;

displaying, via one or more displays, a plurality of symbols arranged in an array of symbol positions, the plurality of symbols including at least one expandable symbol, the array of symbol positions including a designated expandable region, the designated expandable region comprising a plurality of expandable positions indicated by one or more displayed expandable position indicators that are independent of the symbols displayed in the one or more expandable positions and a payline;

randomly varying the symbols displayed in the array of symbol positions, via one or more processors; and if the at least one expandable symbol appears in one of the one or more expandable positions within the designated expandable region, expanding the at least one expandable symbol into at least one other adjacent symbol position in the array, outside of the designated expandable region, to form and display a unified expanded symbol.

16. The method of claim 15, wherein the expandable symbol and the expanded symbol are wild symbols.

17. The method of claim 15, further comprising, after randomly varying the symbols displayed in the array of symbol positions, evaluating the array for winning symbol combinations and expanding the at least one expandable symbol when there are no winning symbol combinations displayed in the array.

18. The method of claim 17, wherein the designated expandable region comprises a row of the array.

19. The method of claim 18, wherein the at least one other adjacent symbol position is either in a row above or below the designated expandable region.

20. The method of claim 15, wherein the plurality of symbols is arranged on a plurality of reels, and the varying step comprises spinning and stopping the reels.

* * * * *